United States Patent [19]

Waletzko

[11] 3,903,916

[45] Sept. 9, 1975

[54] BACKFLOW PREVENTER VALVE

[76] Inventor: Alfred Waletzko, Zum Berger See 137, 582 Gevelsberg, Germany

[22] Filed: July 1, 1974

[21] Appl. No.: 484,964

[52] U.S. Cl. ............... 137/312; 137/377; 137/496; 137/508; 277/177
[51] Int. Cl. ............................................ F16k 41/10
[58] Field of Search .......... 137/312, 377, 382, 496, 137/508; 277/177, 220, 221

[56] References Cited
UNITED STATES PATENTS

| 3,377,076 | 4/1968 | Burnett | 277/177 X |
| 3,590,847 | 7/1971 | Warden | 137/508 X |
| 3,655,208 | 4/1972 | Walker | 277/221 |
| 3,768,503 | 10/1973 | Billington | 137/377 |
| 3,838,707 | 10/1974 | Wachowitz | 137/312 |

Primary Examiner—Harold W. Weakley
Attorney, Agent, or Firm—Karl F. Ross; Herbert Dubno

[57] ABSTRACT

A backflow preventer valve for connecting an inlet conduit to an outlet conduit has a generally cylindrical inlet compartment connected to the inlet conduit and an outlet compartment spaced from the inlet compartment and connected to the outlet conduit. A connecting tube has one end formed as a piston reciprocal in the inlet compartment and another end reciprocal into and out of the outlet compartment. This piston in the inlet compartment is formed with at least one circumferential groove having a frustoconical base tapered toward the outlet compartment and receiving a Teflon-bronze seal ring having overlapping stepped ends. A spring urges the tube into a position with its other end spaced from the outlet compartment so as to prevent fluid flow therebetween. Fluid pressure in the inlet compartment above a predetermined level holds the tube in a flow position against the force of the spring with the other end in the outlet compartment for fluid flow between the compartments. A valve body in the inlet compartment sealingly engage over the one end of the tube when same is displaced out of the flow position.

9 Claims, 5 Drawing Figures

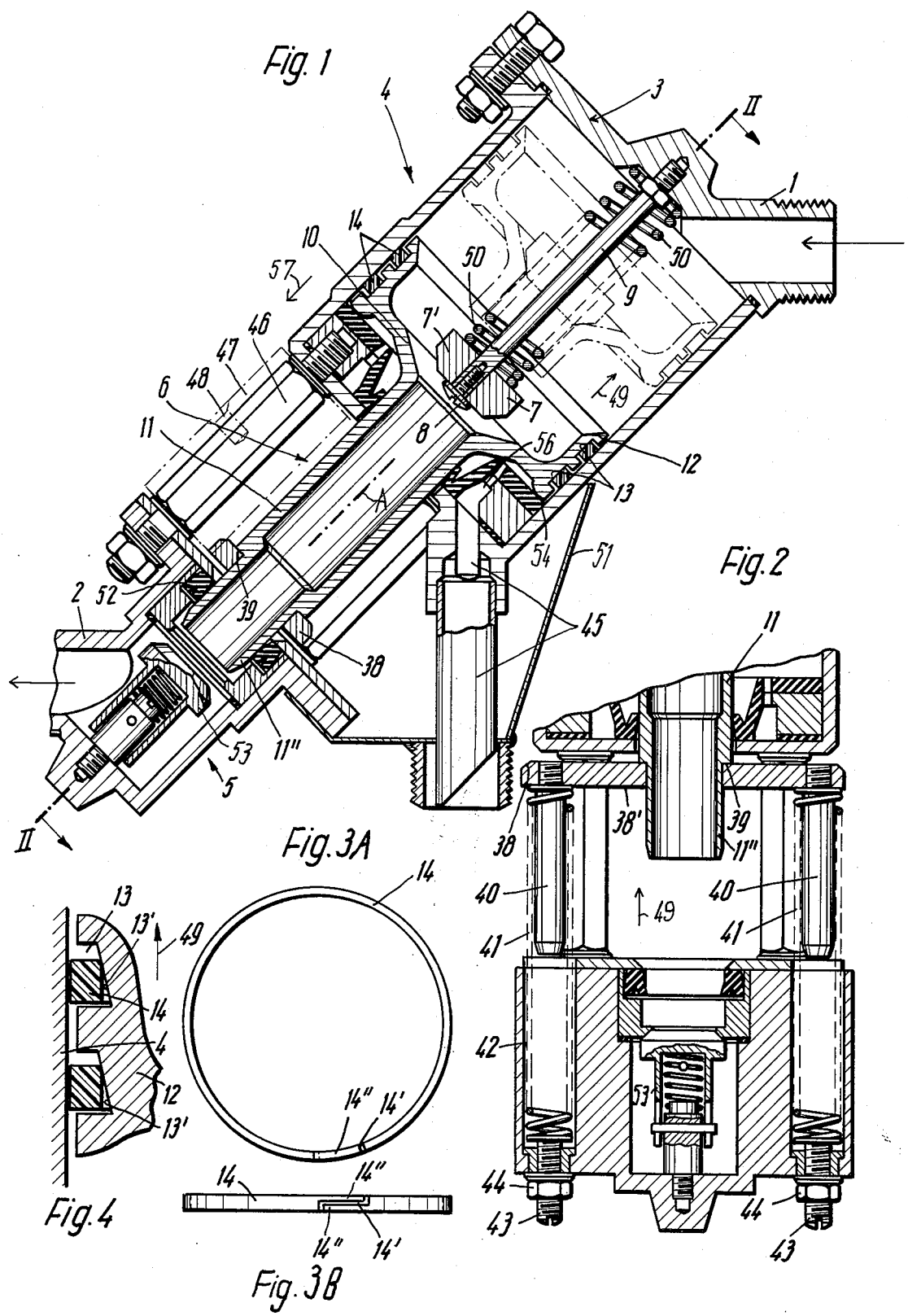

BACKFLOW PREVENTER VALVE

FIELD OF THE INVENTION

The present invention relates to a backflow preventer valve for connecting an inlet conduit to an outlet conduit. More particularly this invention concerns such a valve used on sewer lines or in the handling of chemicals in systems wherein backflow, that is flowback toward the usual source, cannot be permitted.

BACKGROUND OF THE INVENTION

There is known a backflow preventer valve for connecting an inlet conduit to an outlet conduit which has a generally cylindrical inlet compartment connected to the inlet conduit and an outlet compartment spaced from the inlet compartment and connected to the outlet conduit. A connecting tube has one end formed as a flange or piston which is received and reciprocal in the inlet compartment and another end reciprocal into the outlet compartment. This piston is displaceable by fluid pressure in the inlet compartment to a flow position where its other end projects into the outlet compartment so that fluid communication between the two compartments is possible. A spring urges the piston in the opposite direction so that should this fluid pressure drop below a predetermined level the tube is pushed back into the inlet compartment and no longer bridges these compartments, thereby interrupting fluid flow therebetween. A valve body is advantageously provided in this inlet compartment engageable with the one end of the connecting tube so as to plug this end when the tube is moved out of the flow position in which it bridges two compartments.

Such a backflow preventer is provided in systems wherein it is absolutely essential that no fluid be able to flow in a given direction in the feed conduit. Such an arrangement for instance is necessary in a sewer system so as to prevent sewage from flowing into the clean-water lines. In addition it is known to provide such a backflow preventer in the piping systems of chemical plants so as to prevent the backflow of certain substances, such as acids or contaminated solutions, into lines where the substance in question would create a hazard. In order to prevent such backflow the spring is made to bias the connecting tubes such that if the pressure drops below a predetermined level on the inlet side the valve opens, shutting off the inlet lines and the outlet lines and separating the ends of these two lines by an actual physical gap so that should either of the means closing off the ends of these lines fail the fluid therein will merely flow off.

A housing made of bronze customarily forms the two spaced-apart compartments and the tube interconnecting these is also usually also made of bronze. This system is provided with one or more guide rings in the form of circumferential ridges which are loosely received within the cylindrical inlet compartment and serve to guide the piston therein. This creates metal-to-metal contact which results in rapid wear, requiring frequent replacement of the valve, especially when it operates frequently to cut off the inlet conduit. As these guide rings wear the leakage around the piston and out of the valve increases so that a point is eventually reached where it is cheaper to replace the expensive valve than to allow continued fluid loss.

The compartments are usually separated by a plurality of spacer bolts so that once the connecting tube is withdrawn liquid is free to flow out of the valve between these spacer bolts. A funnel is provided underneath the valve to catch any liquid flowing out from between the compartments. When such an arrangement is used with potentially dangerous liquids, such as acids or caustic solutions, the valve on shutting off occasionally emits a spray which can injure any person nearby or cause considerable damage.

OBJECTS OF THE INVENTION

It is therefore an object of the present invention to provide an improved backflow preventer valve.

Yet another object is the provision of such a valve which has a relatively long service life and is safe in operation.

SUMMARY OF THE INVENTION

These objects are attained in accordance with the present invention by forming the piston with at least one outwardly open circumferential groove fitted with a synthetic-resin seal ring loosely received in the groove and having a low coefficient of friction and high resistance to wear. According to this invention the seal ring is made of polytetrafluorethylene, also known as Teflon, which has been impregnated with bronze.

Such an arrangement avoids the deleterious metal-to-metal contact inside the inlet cylinder and increases the service life of the backflow preventer many times. In addition it allows the connecting tube and the inlet cylinder to be constructed with relatively rough tolerances and still function adequately, thereby reducing fabrication costs considerably. In addition in service it has been found that the dripping which is generally tolerated in such valves is almost completely eliminated by such an arrangement, while the necessary flow around the piston end of the tube is still possible to allow this element to recede fully into the inlet compartment on closing of the valve.

In accordance with yet another feature of this invention two such grooves are provided on the piston end of the tube, each having a frustoconical base surface extending between the two flanks of the groove. These frustoconical surfaces are tapered toward the outlet compartment so as to wedge the seals tightly against the inside walls of the inlet compartment as the piston is moving down, prior to insertion of the tube into the outlet compartment, while allowing these seals to float relatively freely when the piston is moving up into the closed position of the valve. When in the fully advanced position the piston end of the tube presses against a further seal provided at the outer end of the inlet chamber.

According to yet another feature of this invention a transparent shield is provided to cover the cage formed by the spacer bolts between the two compartments so as to prevent fluid from spurting out of the valve.

BRIEF DESCRIPTION OF THE DRAWING

The above objects, features, and advantages, will become more readily apparent from the following, reference being made to the accompanying drawing in which:

FIG. 1 is an axial section through the backflow preventer according to this invention;

FIG. 2 is a section taken along a line II—II of FIG. 1;

FIGS. 3A and 3B are top and side views of a seal ring in accordance with this invention; and FIG. 4 is a large-scale view of a detail of FIG. 1.

SPECIFIC DESCRIPTION

As shown in FIGS. 1 and 2 a backflow preventer has a nipple 1 for an inlet conduit and a nipple 2 for an outlet conduit. The housing 3 of the backflow preventer is formed with a cylindrical upper compartment 4 connected to the inlet conduit 1 and with a smaller outlet compartment 5 spaced from the inlet compartment 4 and connected to the outlet conduit 2. A connecting tube 6 has a tube portion 11 and a piston portion 12 centered on an axis A of the device. The valve body 7 is axially slidable on a rod 9 extending along the axis in the compartment 4 with a spring 50 normally pressing the valve body 7 against a stop screw 8 at the end of the rod 9 toward the compartment 5. This body 7 is formed with a frustoconical valve surface 7' adapted to engage a similarly frustoconical seat 10 at the end of the tube 6 so as to seal off this tube when it is moved from the flow position shown in solid lines in FIG. 1.

The piston portion 12 is formed with a pair of circumferential grooves 13 which, as shown in FIG. 4, have frustoconical base surfaces 13' tapered toward the outlet compartment 5. Each groove 13 receives a respective Teflon and bronze seal ring 14 which, as shown in FIGS. 3A and 3B, is stepped at 14' so as to have a pair of half-width end sections 14'' that overlap.

The two compartments 4 and 5 are spaced apart by a plurality of heavy-duty spacer bolts 46 to which is secured a transparent shield 47 by means of screws 48. This shield 47 is advantageously made of polymethylmethacrylate, also known as Lucite. A funnel 51 connected to a drain is provided under the gap between the two compartments 4 and 5 so as to catch any liquid issuing therefrom.

Tube section 11 of the tube element 6 has an end 11'' receivable in the compartment 5 and snugly engageable with a U-cup gland 52. A check valve 53 is provided in this compartment 5 which opens when fluid pressure on the side of it away from the outlet conduit 2 rises above a predetermined level, which otherwise acts as a conventional check valve. The end 11'' is stepped at a shoulder 39 against which rides a plate 38 carrying a pair of rods 40 around which are provided compression strings 41 each having one end engaging the undersurface 38' of the plate 38 and another end engaging an adjustment screw 43 held tight by means of a lock nut 44. Thus these springs 41 urge the tube element 6 in a direction 49 into the position shown in dot-dash lines in FIG. 1 and in solid lines in FIG. 2. In this position fluid flow between the compartments 4 and 5 is virtually impossible.

The outer end of the compartment 4 is provided with a gland 54 engaging the tube 11 and formed with a plurality of holes 55 allowing fluid communication with a compartment 56 connected to a drain conduit 45.

The backflow preventer operates as follows:

Under normal conditions the fluid pressure in chamber 4 is considerably greater than that in chamber 5 so that the tube 6 is pressed down against the force of springs 41 into the position shown in solid lines in FIG. 1. In this position the seat 10 has pulled away from the valve body 7 so that fluid can flow through the center of the tube 6, past the check valve 53, and out the outlet conduit 2.

Should the pressure in the inlet conduit drop below a predetermined level, the force of springs 41 will serve to lift the tube element 6 up against the fluid pressure in the inlet compartment until the seat 10 presses against the valve body 7, whereupon fluid communication between the compartments 4 and 5 is interrupted. The switchover pressure is determined by the adjustment of springs 41. Once the piston end 12 starts to move axially in the direction of arrow 49 it loses contact with the seal 54 and the seal rings 14 are displaced into the deeper ends of the groove 13 loosely receiving them. This allows fluid in the compartment 4 to leak past the piston 12, flowing through the apertures 55 to the chamber 56 and thence out of the arrangement so that unless the pressure in the inlet chamber 4 is increased the tube will slowly pull back and its end 11'' will pull out of the compartment 5. The tube 6 will rise into the position shown in dot-dash lines in FIG. 1 and in solid lines in FIG. 2 so that fluid communication between the chambers 4 and 5 is impossible.

When the fluid pressure in compartment 4 is again increased the piston 12 and valve body 7 will start to move down again, in the direction 57 opposite the direction 49. This will cause the seals 14 to ride into the narrow ends of the grooves 13, thereby wedging themselves tightly against the interior of the compartment 4 and preventing any leakage around the piston 12. This piston 12 will move down toward the outlet compartment 5 until the end 11' enters this outlet compartment and makes sealing contact with the gland 52. The valve body 7 will then come against the end stop 8 and pull away from the seat 10 so that fluid can pass through the tube 11 and into the outlet compartment 5 thereby again restoring full communication between the compartments 4 and 5.

Such an arrangement has an extremely long service life, as the Teflon and bronze seal rings 14 have a very low coefficient of friction and high resistance to wear. The device operates quickly and unfailingly to disconnect the inlet and outlet conduits should there be a failure in pressure in the inlet conduit that could potentially allow flow from the outlet conduit back.

I claim:

1. A backflow preventer valve for connecting an inlet conduit to an outlet conduit, said valve comprising:
    a generally cylindrical inlet compartment connectable to said inlet conduit;
    an outlet compartment spaced from said inlet compartment and connectable to said outlet conduit;
    a connecting tube having one end formed as a piston received in said inlet compartment and another end receivable in said outlet compartment, said piston being formed with at least one circumferential groove turned toward the interior of said inlet compartment;
    a synthetic-resin seal ring loosely received in said groove and having a low coefficient of friction and high resistance to wear;
    a spring urging said tube into a position with said other end spaced from said outlet compartment, whereby fluid pressure in said inlet compartment above a predetermined level holds said tube in a flow position with said other end in said outlet compartment for fluid flow between said compartments; and
    a valve body in said inlet compartment sealingly engageable over said one end of said tube on displacement thereof from said flow position.

2. The valve defined in claim 1 wherein said seal ring is made of polytetrafluorethylene impregnated with bronze.

3. The valve defined in claim 1 wherein said ring is split and has a pair of overlapping stepped ends.

4. The valve defined in claim 1 wherein said groove has a frustoconical base tapered toward said outlet compartment.

5. The valve defined in claim 1, further comprising a plurality of spacer bolts extending between said compartments and a transparent shield secured to said spacer bolts.

6. The valve defined in claim 1, further comprising a spring urging said valve body toward said one end of said connecting tube.

7. The valve defined in claim 1 wherein said compartments are made of bronze.

8. The valve defined in claim 1, further comprising a funnel between and under the space between said compartments, and adapted to be connected to a drain conduit.

9. The valve defined in claim 1, wherein said piston is formed with a pair of such grooves each provided with a respective seal ring.

* * * * *